(12) United States Patent  
Bischoff

(10) Patent No.: US 7,230,611 B2
(45) Date of Patent: Jun. 12, 2007

(54) HMI DEVICE WITH OPTICAL TOUCH SCREEN

(75) Inventor: Toni Gerhard Bischoff, Petersaurach (DE)

(73) Assignee: Siemens Aktiengesellschaft, Munich (DE)

( * ) Notice: Subject to any disclaimer, the term of this patent is extended or adjusted under 35 U.S.C. 154(b) by 535 days.

(21) Appl. No.: 10/683,263

(22) Filed: Oct. 14, 2003

(65) Prior Publication Data

US 2004/0131361 A1 Jul. 8, 2004

(30) Foreign Application Priority Data

Dec. 20, 2002 (DE) ................. 102 60 305

(51) Int. Cl.
*G09G 5/00* (2006.01)
*G06F 3/042* (2006.01)
*G06F 3/00* (2006.01)
*H04N 7/14* (2006.01)
*G03B 21/22* (2006.01)

(52) U.S. Cl. .................. 345/175; 178/18.09; 178/18.1; 178/18.11; 348/14.03; 348/744; 348/756; 715/863; 715/864; 353/71; 353/119

(58) Field of Classification Search ................. 345/2.1, 345/2.3, 9, 110, 173, 175; 715/744, 763, 715/764, 863; 353/47, 48, 72, 74, 119; 348/787, 348/789, 14.03; 352/179; 178/18.09–18.11
See application file for complete search history.

(56) References Cited

U.S. PATENT DOCUMENTS 4,670,738 A  6/1987 Weinblatt

| 5,528,263 | A | * | 6/1996 | Platzker et al. ............. 345/156 |
| 6,176,782 | B1 | * | 1/2001 | Lyons et al. .................. 463/36 |
| 6,281,878 | B1 | * | 8/2001 | Montellese .................. 345/156 |
| 6,359,612 | B1 | * | 3/2002 | Peter et al. .................. 345/156 |
| 6,394,610 | B2 | * | 5/2002 | Rodriguez, Jr. .............. 353/79 |
| 6,414,672 | B2 | * | 7/2002 | Rekimoto et al. .......... 345/173 |
| 6,864,882 | B2 | * | 3/2005 | Newton ....................... 345/173 |
| 6,965,376 | B2 | * | 11/2005 | Tani et al. ................... 345/173 |
| 7,034,807 | B2 | * | 4/2006 | Maggioni .................... 345/173 |
| 2002/0021287 | A1 | | 2/2002 | Tomasi et al. |

FOREIGN PATENT DOCUMENTS

| DE | 40 36 994 A1 | 5/1990 |
| DE | 199 51 322 A1 | 4/1999 |
| DE | 199 51 233 A1 | 5/1999 |
| DE | 199 18 072 A1 | 6/1999 |
| DE | 198 30 968 A1 | 1/2000 |
| EP | 0 369 188 A2 | 5/1990 |
| EP | 0 903 653 A2 | 3/1999 |
| EP | 1 039 365 A2 | 9/2000 |

\* cited by examiner

*Primary Examiner*—Henry N. Tran
(74) *Attorney, Agent, or Firm*—Sughrue Mion, PLLC

(57) ABSTRACT

An HMI device for monitoring and control of a technical process, which has a processing module (VE) at least for computer generating dynamic process images (PA1) that have interactive regions (P10–P15). Further, at least one optical transmitter and receiver module (LPE1) is provided, which has a data link (DV1) to the processing module (VE). The module has a projector (LO1) for generating light images (PE) of the dynamic process images (PA1). Further, it has a detector (LD) for spatially detecting pointing actions of an operator (H) to interactive regions (P10–P15) in the light image (PE) of a dynamic process image (PA1).

15 Claims, 8 Drawing Sheets

HMI DEVICE WITH OPTICAL TOUCH SCREEN

The following disclosure is based on German Patent Application No. 102 603 05.7, filed on Dec. 20, 2002, which is incorporated into this application by reference.

FIELD OF AND BACKGROUND OF THE INVENTION

The invention relates to an HMI device. In particular, the invention relates to an HMI device equipped with an optical touch screen.

Technical installations are often controlled and operated with the aid of digital programmable data processing systems. The term 'technical installation', as used here, designates any type of technical equipment and systems arranged either individually or in a data network, e.g., via a field bus. Technical installations in an industrial application should be understood to mean, inter alia, items of individual equipment, such as drives, machine tools, intelligent transducers, sensors, etc. A technical installation, however, can also be an entire production plant in which an entire technical process is operated with locally distributed equipment, e.g., a chemical plant, an assembly line or a processing plant.

Technical installations are operated and controlled with the aid of digital programmable data processing systems, which often take the form of an automation system or a component thereof. Automation systems are equipped with special devices that form the interface between an operator and the automation system. Such devices are generally referred to as HMI devices, i.e., "Human Machine Interfaces." This line of equipment is also referred to as devices for the "control and monitoring" of technical installations or "C&M devices" for short. These devices are connected upstream of the devices that are used for the direct control of a technical installation, e.g., the PLCs or Programmable Logic Controllers. This relieves a central control device, e.g., a stored program controller or SPC.

The term HMI equipment or HMI device should be understood as a generic term and also includes all the components belonging to this group. Examples of such components are, e.g., operator panels or OPs for short and industrial personal computers or IPCs used as HMI devices or associated programming devices. HMI devices, due to their special functionality, may assume functions, e.g., in a networked automation system, which can be generally viewed as specifying and post-processing data of the technical installation to be controlled. This function is also generally referred to as supervisory control and data acquisition (SCADA). For this purpose, an HMI device must typically execute a special type of software. Thus, an HMI device provides functions enhancing the comfort, quality and safety of an operator's control, e.g., an overview of the equipment to be operated and error-free operator actions.

HMI devices can be used, for example, not only to visualize and control interactive process images of the technical installation to be controlled but also to configure and generate them. This makes it possible, on the one hand, to selectively display the responses of the technical installation, typically in the form of measured values and signals. On the other hand, by specifically defining operator actions, the technical installation can be brought into desired states. In addition to these "monitoring and control" functions, an HMI device can be used for plant-specific configurations, e.g., to configure interactive process images.

The housings of prior art HMI devices are structurally designed in such a way that they can be installed as flush as possible in flat surfaces located, for example, on the outside of switchgear cabinets, on the topside of industrial control panels, operator consoles, control cabinets, etc. One housing side of the HMI device is configured as a user panel that lies as flush as possible on the respective surface, e.g., the door of a switchgear cabinet. The contact surface may be built in such a way that the entire arrangement meets the required degree of protection against dust and moisture, e.g., meets the IP65 or NEMY4x standard. The electrical and electronic components of the HMI device are accommodated behind the user panel in a box-like attachment whose dimensions are smaller than the length of the edges of the user panel. When such an HMI device is installed, e.g., in the surface of a control console, the box-like attachment can therefore be lowered into a corresponding recess while the protruding user panel sits on the edges of the recess and covers them completely. The user panel is normally sealed completely against external influences, particularly splash water and dust, and has electronic display elements, e.g., LCDs and keys or keypads. The keys or keypads can be configured, for example, as membrane keyboards with an application-specific arrangement and labeling. Such keypads can furthermore be largely sealed against external influences. In other embodiments, the HMI device can also be equipped with a touch display on the user panel. This touch display makes it possible to actuate switching functions by touching preprogrammed areas, e.g., in a process image configured for a specific application. In such an embodiment, additional keys or keypads can usually be eliminated.

HMI devices in the above-described widely used, and by now practically standard, conventional packaging structures have various drawbacks. For example, HMI devices with separate keypads are limited in the extent to which they can be adapted. Although the existing keys of such an HMI device may be assigned different functions, the number of the keys and their layout can of course no longer be changed. In contrast, for example, keypads displayed on HMI devices using a touch display can be adapted as a function of the application to reflect practically any modifications in the associated technical process. The use of a touch screen in an HMI device, however, is technically complex. Furthermore, the use of HMI devices with a touch screen, especially in a harsh and dirty environment, may be problematic.

OBJECTS OF THE INVENTION

One object of the invention is to provide a new and different configuration for an HMI device for use in industry, which is as immune as possible to environmental influences. It is a further object to provide such an HMI device that is not overly limited in the extent to which the control environment can be adapted to changes in the associated technical process.

SUMMARY OF THE INVENTION

These and other objects underlying the invention are attained by the features of the HMI devices claimed. According to one formulation, the HMI device according to the invention is used to monitor and control a technical process and has a processing module at least for computer generating dynamic process images that have interactive regions. It also has at least one optical transmitter and receiver module with a data link to the processing module. The processing module has a configuration component for generating light images of the dynamic process images and a detection component for spatially detecting an operator's pointing actions to interactive regions in the light image of a dynamic process image.

Advantageous refinements of the HMI device according to the invention are set forth in the dependent claims. Other claims defining aspects of the invention are directed to a mounting device with an HMI device according to the invention, advantageous uses of an HMI device according to the invention, and an automation system with an associated HMI device.

BRIEF DESCRIPTION OF THE DRAWINGS

Advantageous and exemplary embodiments of the invention and attendant advantages of the invention will now be described in greater detail, by way of example, with reference to the specific, preferred embodiments depicted in the figures.

DETAILED DESCRIPTION OF THE PREFERRED EMBODIMENTS

Figure 1:
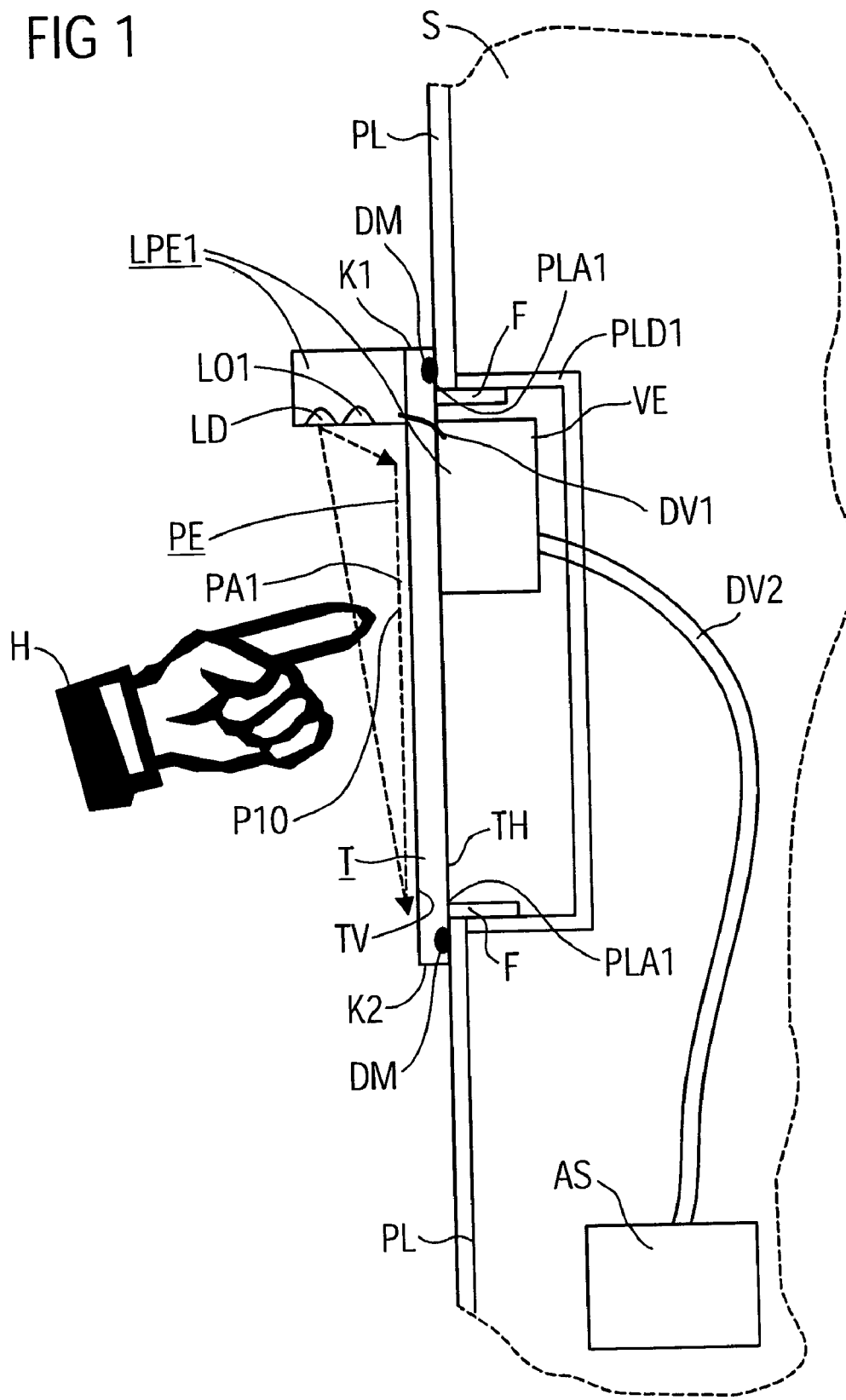
FIG. 1 is a side view of a first embodiment of an HMI device configured according to the invention in which the HMI device advantageously has a separate support plate as the projection area and is placed flat onto a mounting opening of a mounting surface.

FIG. 1 is a side view of a first embodiment of an HMI device configured according to the invention. It has a processing module VE at least for computer generating dynamic process images. These images have interactive regions that can be actuated by an operator. In FIG. 1, this actuation is symbolized by the hand H of an operator pointing, by way of example, to an interactive region P10 in the light image PE of a dynamic process image PA1 displayed by the HMI device. The light image PE of the dynamic process image PA1 of a "DRILLING MACHINE" will be described in greater detail with reference to FIG. 2, which depicts a front view of the exemplary HMI device of FIG. 1.

The HMI device of FIG. 1 further has at least one optical transmitter and receiver module LPE1, which is linked to the processing module VE via a first data connection DV1. If the HMI device is a component of a large automation system, the data is normally exchanged with a higher-level central processing unit AS. This is an automation system, such as a SIMATIK type control, that records current measured values of the process and transmits them to the HMI device for display via an additional data connection DV2. Conversely, operator signals detected by the transmitter and receiver module LPE1 are transmitted from the HMI device back to the automation system.

The optical transmitter and receiver module LPE1 of the HMI device according to the invention has projection means LO1 for generating a light image PE of the dynamic process image PA1. It also has detection means LD for spatially detecting pointing actions to interactive regions P10 in the light image PE by an operator H. Advantageously, these projection means LO1 and detection means LD are mounted in a common housing of the transmitter and receiver module LPE1 on the outside of the HMI device. According to the invention, the projection means project a light field PE, which is symbolized by dashed arrows in FIG. 1 and is covered as completely as possible by the detection means LD. These detection means LD, on an infrared basis, for example, enable accurate detection of the position of a pointing action, e.g., by the hand H of an operator. In the processing module VE, a position thus detected can be assigned to a picture element in the process image and be interpreted as an actuation of this picture element.

Based on the possibilities afforded by the optical transmitter and receiver module of the HMI device according to the invention for monitoring and control of a technical process, this module can be considered quasi an optical or virtual touch screen. Control by a person, e.g., by means of his/her hand H, does not require any mechanical elements and is therefore completely wear-free. As may be seen from FIG. 1, the invention does not even require contact. Rather, it is sufficient to immerse a pointing object, e.g., the index finger of a hand H, into the radiation and detection field PE. Contamination problems are thus almost completely avoided. It is further advantageous if the sensitivity of the optical transmitter and receiver module can be adjusted as a function of the application using a configurable detection threshold. This prevents false tripping of interactive regions in a dynamic process image, e.g., by flying insects.

The HMI device according to the invention is furthermore highly adaptable. In practice, the configuration of a technical installation is subject to changes even during operation, e.g., as a result of repairs or modifications. As a rule, adding or replacing transducers, possibly shutting down installation parts temporarily or starting them up again, etc., also entails adaptations in the HMI devices used for monitoring and control. Until now, with conventional HMI devices, such modifications could be taken into account only by adapting the corresponding process image. By nature, any adaptation of the existing wired pushbuttons was limited to their signal assignment. Such limitations do not exist in the HMI device according to the invention. A further advantage of the HMI device according to the invention is that conventional LCD displays with superposed touch screens are no longer required. Thus, the solution according to the invention is not only more cost effective but also more robust and can be used even at temperatures well below freezing.

It is advantageous if the HMI device according to the invention is provided with a separate support plate T, which serves as a projection area for the light image PE of the dynamic process image PA1. Particularly rough or very colorful surfaces on mounting devices are unsuitable or only conditionally suitable as projection areas. In such a case, a support plate T makes it possible to achieve constant, optimal projection conditions. Such an embodiment is already taken into account in the example of FIG. 1. The support plate T of the HMI device, which is advantageously mounted vertically, can be adapted especially for industrial use and can be equipped, for example, with a dirt, grease and oil-resistant surface. For this purpose, the surface of the support plate T can have, for example, a so-called lotus leaf effect. In such an embodiment it is particularly advantageous if the at least one optical transmitter and receiver module LPE1 of the HMI device is mounted on the front side TH of the support plate T and the processing module VE on the rear side TH of the support plate T. The at least one optical transmitter and receiver module LPE1 is mounted in the area of a lateral edge of the support plate T, in the example of FIG. 1 on the upper lateral edge K4, particularly to achieve optimal utilization of the entire surface of the support plate T as a projection area. The data connection DV1 for linking the transmitter and receiver module LPE1 to the processing module VE is also brought through the support plate T.

In the example shown in FIG. 1, the HMI device according to the invention is carried by a mounting device S. This mounting device can also accommodate several HMI devices and various other control devices, e.g., ON/OFF switches, etc. The mounting device S is preferably a switchgear cabinet, an operator and/or control console or a control panel. Such mounting devices are frequently used as top units or built-in units in vehicles, locomotives, ships, cranes, control rooms of power plants, etc. The mounting device S shown partially in FIG. 1 by way of example has a vertical mounting surface PL for supporting the HMI device according to the invention. This can, for example, be the door or sidewall of a switchgear cabinet, the front area of an operator and/or control console or a control panel. A central processing unit AS, if present, is preferably also arranged in the interior of the mounting device S.

In an embodiment of the HMI device according to the invention that is particularly suited for industrial applications, the edge lengths K1, K2, K3, K4 of the support plate T are increased relative to the dimensions of the processing module VE. As a result, the processing module can be inserted into a mounting opening PLA1 in the mounting surface PL, while the support plate T, which protrudes all around so to speak, completely covers the mounting opening PLA1 around the circumference thereof. Such an embodiment is also illustrated in the example of FIG. 1. The HMI device according to the invention can then be placed as flush as possible on top of the mounting area, essentially like a panel. In this embodiment of the HMI device as an insertable panel, in which the support plate T has the function of a front plate that protrudes on all sides, it is advantageous if the support plate T, at least in the area of the lateral edges K1, K2, K3, K4, has circumferential means DM to produce a tight seal in relation to the edge of the mounting opening PLA1.

If the support plate T, the optical transmitter and receiver module LPE1 and the processing module VE of the HMI device advantageously form a standalone unit, an operator, if required, can remove this unit like a mobile device from the mounting opening PLA1 and use it as a manual panel. This is further facilitated if the data connection DV2 between the processing module VE and a central processing unit AS is wireless, i.e., preferably a radio link. After completion of the control actions performed by the operational staff, e.g., in the immediate proximity of a corresponding piece of equipment of the associated technical process, the operator can put the HMI device back into the mounting opening PLA1 and thereby release it for future operator actions. In such an embodiment, the mounting opening PLA1 is advantageously sealed on the inside of the support surface PL by a rear cover PLD1. Removal from and reinsertion into the mounting opening PLA1 of the HMI device is facilitated by guides F suitably positioned on the rear side of the support plate T.

Figure 2:
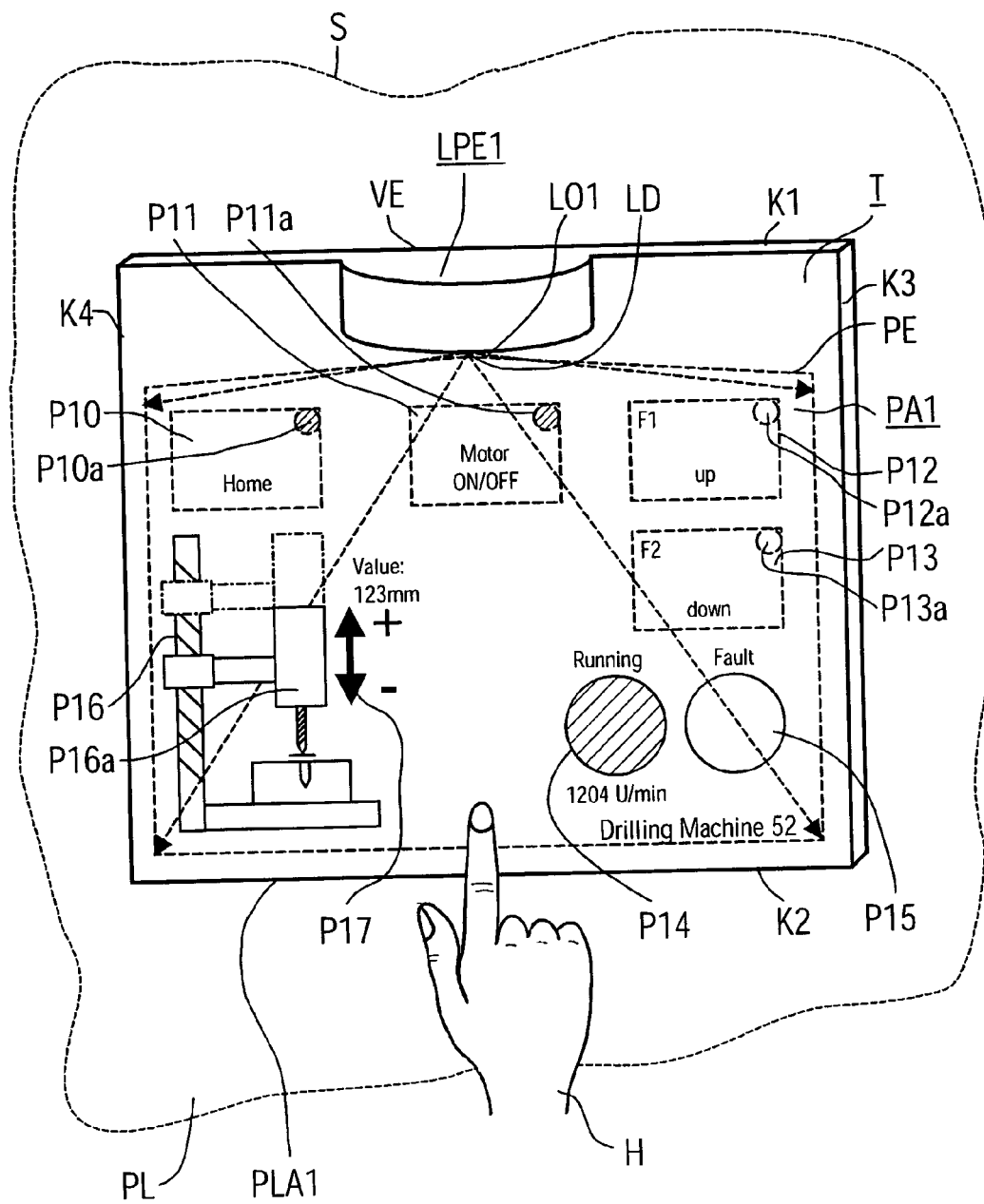
FIG. 2 is a front view of the exemplary HMI device of FIG. 1, with the light image of the dynamic process image of a "DRILLING MACHINE" projected onto the support plate.

FIG. 2 is a front view of the exemplary HMI device of FIG. 1. The light image PE of the dynamic process image PA1 of a "DRILLING MACHINE 52" is projected onto the support plate T. As described with reference to FIG. 1, the separate support plate T is placed flat over a mounting opening PLA1 in the mounting surface PL behind it and is tightly sealed in relation thereto around all the lateral edges K1, K2, K3, K4. The processing module VE on the rear side of the support plate T is thus completely inserted into the interior of the mounting device S. The optical transmitter and receiver module LPE1 with the integrated projection means LO1, particularly a laser source with a laser lens system, and the integrated detection means LD, e.g., a CCD sensor, is advantageously placed in the center of the upper lateral edge K1. Thus, the major portion of the surface of the support plate T can be used as a projection area. In the example depicted in FIG. 2, this projection and detection field PE is symbolically indicated by a broad dashed line and arrows pointing to the corners of this field PE.

The first freely configurable process image PA1 depicted in FIG. 1 by way of example relates to a drilling machine in an assembly line, which is identified as "drilling machine 52." To visualize it, a dynamic equipment image P16 is provided. This image can display different positions of the drill head P16a, e.g., the extended state at top dead center or the active state during a drilling process. The actual value display P17, "VALUE," signals the current height of the drill head.

The dynamic process image PA1 depicted in FIG. 1 further has interactive regions P10 to P15. Each of these regions is associated with a separate switching status display P11a to P15a in the form of a virtual lamp in the top right corner of the respective interactive region. The first interactive region P10 has the function of a virtual control element P10. If the region P10 is actuated, e.g., by pointing to it with a hand H, the display is reset to an initial state labeled "HOME." A second virtual control element P11 is labeled "MOTOR_ON/OFF" and switches the drive motor of the drilling machine on or off when the HMI device is used like a virtual touch screen. By actuating a third virtual control element P12 "F1_up" or a fourth virtual control element P13 "F2_down," the drill head P16a can be raised or lowered into its working position. Finally, the first and second status displays "RUNNING" P14 and "FAULT" P15 indicate the operating state of the drive of the drilling machine.

Figure 3:
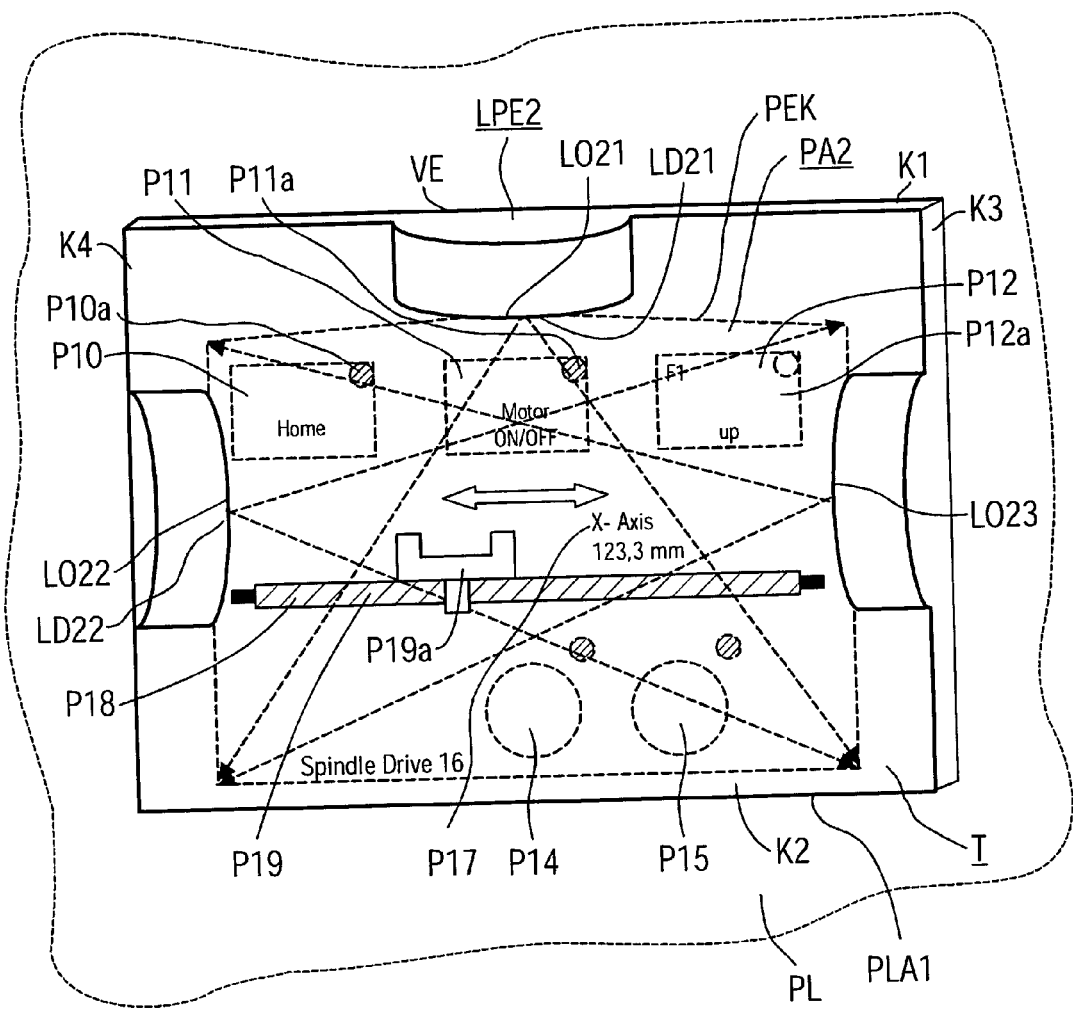
FIG. 3 is a front view of a second embodiment of an HMI device configured according to the invention, in which the optical transmitter and receiver module has separate projection components with different primary colors to project the colored light image (PEK) of the dynamic process image of a "SPINDLE DRIVE" onto the support plate.

FIG. 3 is a front view of a second embodiment of an HMI device configured according to the invention, in which the optical transmitter and receiver module LPE2 has, for example, three separate projection and detection means. The three projection means LO21, LO22, LO23 are positioned, for example, along the longitudinal edges K1, K3, K4. Each of these projection means radiates in a different primary color, such that a colored light image PEK can be projected onto the support plate T. In another embodiment (not depicted), it is basically also possible to accommodate the differently colored projection means LO21, LO22, LO23 in a common housing that is positioned, for example, at the upper longitudinal edge.

The distribution of the projection means LO21, LO22, LO23 among the three longitudinal edges K1, K3, K4 as shown in the example of FIG. 3 also makes it possible to arrange separate detection means so that they are spatially distributed. For example, a detection means LD21 or LD22 is positioned next to each projection means LO21 or LO22. In principle, it is also possible to use more than two separate detection means. The colored projection and detection field PEK is thus monitored by two offset detection means. This has the advantage that interactive regions positioned linearly one behind the other cannot be covered up as seen from the angle of one detection means. In the example of FIG. 3, dashed arrows radiate from each projection means LO21, LO22, LO23 to symbolize the projection and detection field. The projection and detection field PEK is thus multiply covered.

This embodiment has the advantage that it enables, for example, "two-handed control," which is prescribed, in particular, for safety-related operator actions. If, for example, a first pointing action to an interactive region in the front masked a second pointing action to an interactive region behind as seen by one of the detection means, the second pointing action could be safely detected by the second detection means, which is arranged offset or on the opposite side. This embodiment of the HMI device according to the invention, which is equipped with a quasi virtual touch screen, thus also enables safety-related "two-handed control." Furthermore, so-called "multi-finger control" is also possible, i.e., operator actions that simultaneously actuate several interactive regions in a dynamic process image.

The HMI device in the example shown in FIG. 3 depicts, by way of example, a second freely configurable and dynamic process image PA2 of a linear drive identified as "spindle drive 16." Accordingly, the associated dynamic equipment image P18 shows the linear drive with a drive spindle P19 and a slide P19a guided thereby. The slide P19a is displayed dynamically in a position that approximately corresponds to its actual relative position on the spindle. The interactive regions P10 to P15 and the separate switching status displays P11a to P15a associated therewith and shown in the form of a virtual lamp in the top right corner of the respective interactive region largely correspond to the configuration in the dynamic process image PA1 of FIG. 1. Finally, there is an actual value display P17 "X-AXIS," which signals the relative position of the slide on the spindle.

Figure 4:
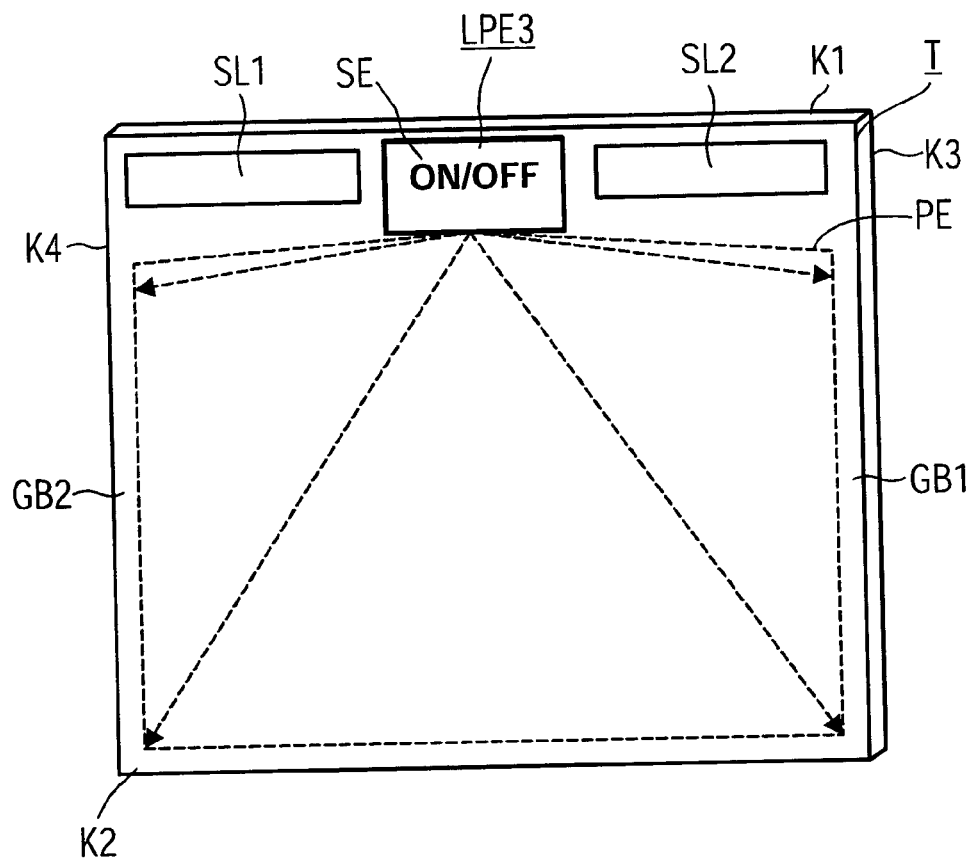
FIG. 4 is a top view of a third embodiment of an HMI device configured according to the invention, which is configured like a mobile device and the optical transmitter and receiver module of which can be lowered into a recess in the processing module.
Figure 5:
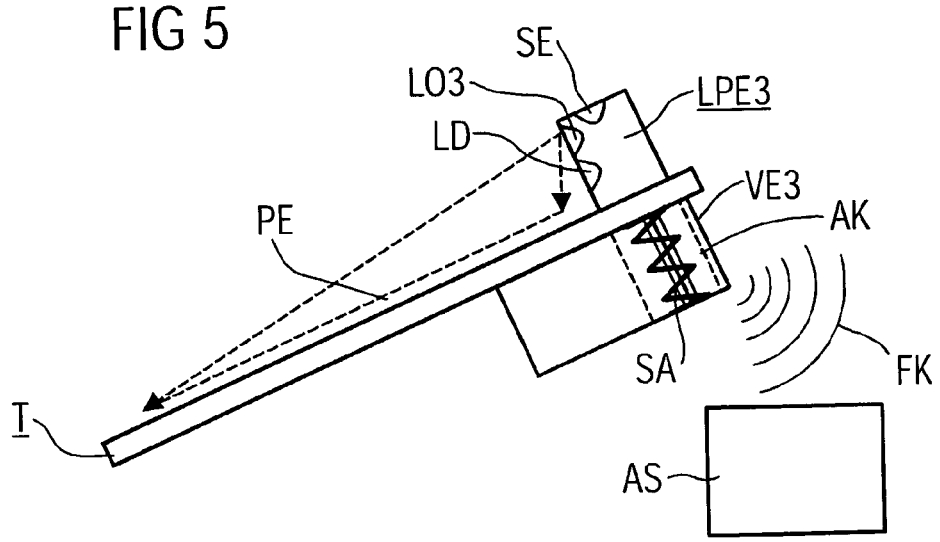
FIG. 5 is a side view of the HMI device according to the embodiment of FIG. 4.

FIG. 4 is a top view of a third embodiment of an HMI device according to the invention, which is configured as a mobile device. In this embodiment, the optical transmitter and receiver module can be retracted into a recess in the processing module. FIG. 5 is a side view of the HMI device of FIG. 4. The two FIGS. 4 and 5 will now be described together.

A user can easily handle the support plate T of the HMI device of FIG. 4 like a drawing or writing board. The vertical lateral edges K3, K4 of the support plate T are preferably configured as grip areas GB1, GB2, for example by additional non-slip surface coatings. The configuration of the HMI device of FIG. 4 is especially adapted for use in dirty environments. The at least one optical transmitter and receiver module LPE3 and the processing module VE3, which is preferably positioned directly behind it, form a physical unit such that the optical transmitter and receiver module LPE3 can be retracted into a recess AK within the processing module VE3. The projection means LO3 and detection means LD contained in the transmitter and receiver module LPE3 are thus protected against almost any external influences when they are retracted. Advantageously, when retracted, the topside of the optical transmitter and receiver module LPE3 is as flush as possible with the surface of the surrounding support plate T. FIG. 5 shows the transmitter and receiver module LPE3 in its extended state.

Advantageously, additional servo drive means SA are provided for retracting and extending the optical transmitter and receiver module LPE3 into or from the recess AK of the processing module VE3. They are operator-actuatable as a function of the application, e.g., by a control element SE, which is advantageously located on the topside of the transmitter and receiver module LPE3 and is labeled "ON/OFF" in FIG. 4. Handling in mobile use is further improved if the HMI device has a wireless data connection FK, particularly an air interface, between the processing module VE3 and a central processing unit AS, e.g., an automation system. Finally, it is advantageous if at least one solar cell is provided to supply power to the optical transmitter and receiver module LPE3 and the processing module VE3. In the example of FIG. 4, a solar cell SL1, SL2 is provided on each of the two sides of the optical transmitter and receiver module LPE3.

Figure 6:
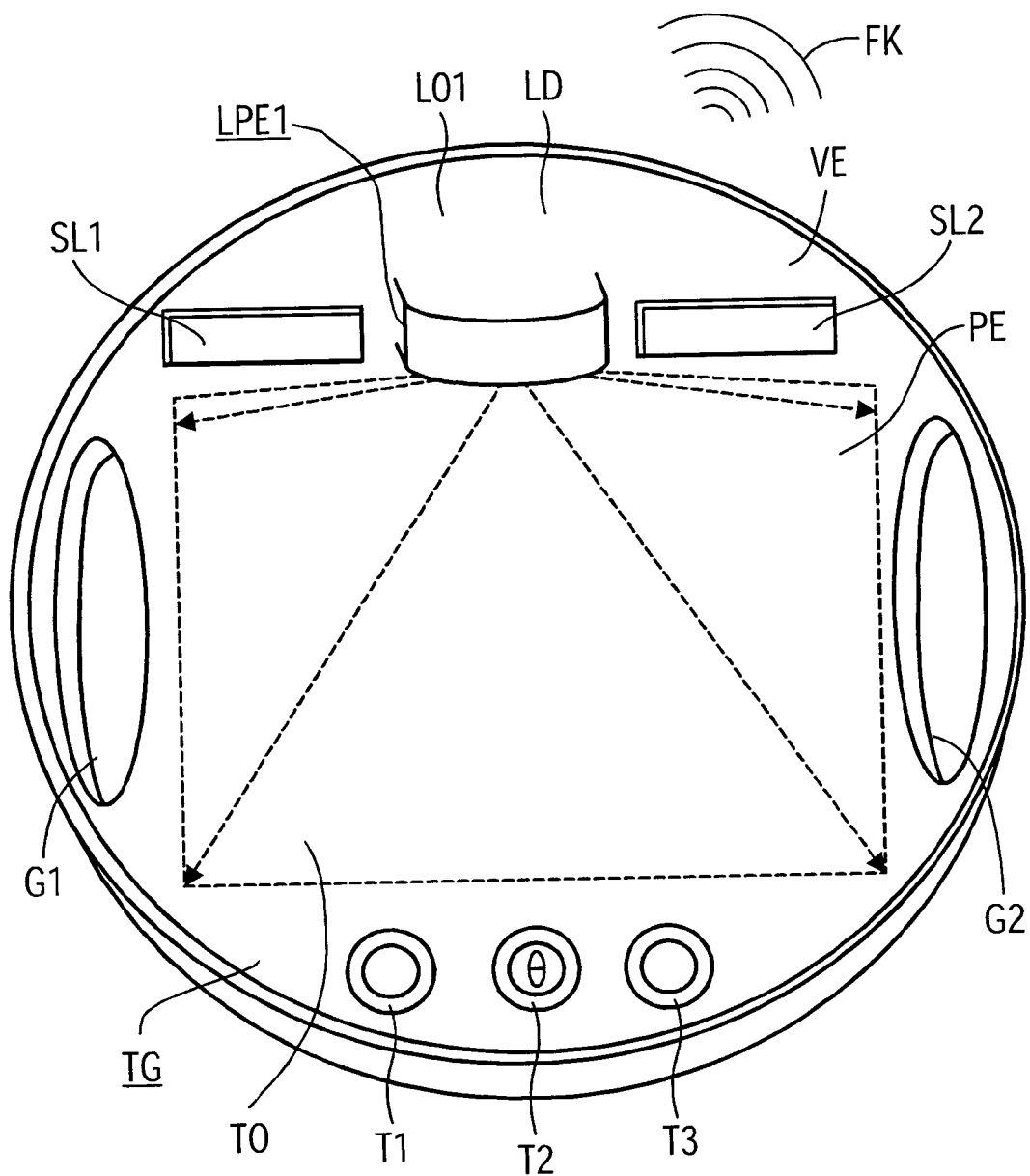
FIG. 6 is a top view of a fourth embodiment of an HMI device configured according to the invention having a housing in the form of a mobile handheld terminal.

FIG. 6 is a top view of a fourth embodiment of an HMI device configured according to the invention, which has a housing TG in the form of a mobile handheld terminal. The housing TG preferably has a round or oval outer contour without any protruding edges. Advantageously, two opposite grip areas G1, G2 are cut out of the housing on the sides. The external housing side TO therebetween serves as the projection area for the light image PE of a dynamic process image. This process image in turn is generated by an optical transmitter and receiver module LPE1 that protrudes from the housing topside TO in the upper area of curvature of the housing TG and is flanked on both sides by solar cells SL1, SL2 for an autonomous power supply. For backup power, rechargeable batteries and/or backup batteries are provided in the interior of the handheld terminal.

The configuration depicted in FIG. 6 has the further advantage that the processing module VE is accommodated in the interior of the housing TG where it is protected. Only the portion of the optical transmitter and receiver module LPE1 containing the projection means LO1 and the detection means LD is guided to the outside from the interior of the housing through a correspondingly shaped and sealed opening. The housing TG can be uniformly protected all around against dust and moisture. If at least the optical transmitter and receiver module LPE1 is completely encapsulated it can even be used under water.

A plurality of other, particularly mechanical control and operating elements can be located on the topside of such a mobile handheld terminal. In the lower area of the curvature of the housing TG on the housing topside TO, an emergency OFF switch T1, a key operated switch T2 and an ON/OFF switch T3 are shown by way of example. Here, too, the processing module VE in the interior of the housing advantageously has a wireless data transmission link FK to a central processing unit.

Figure 7:
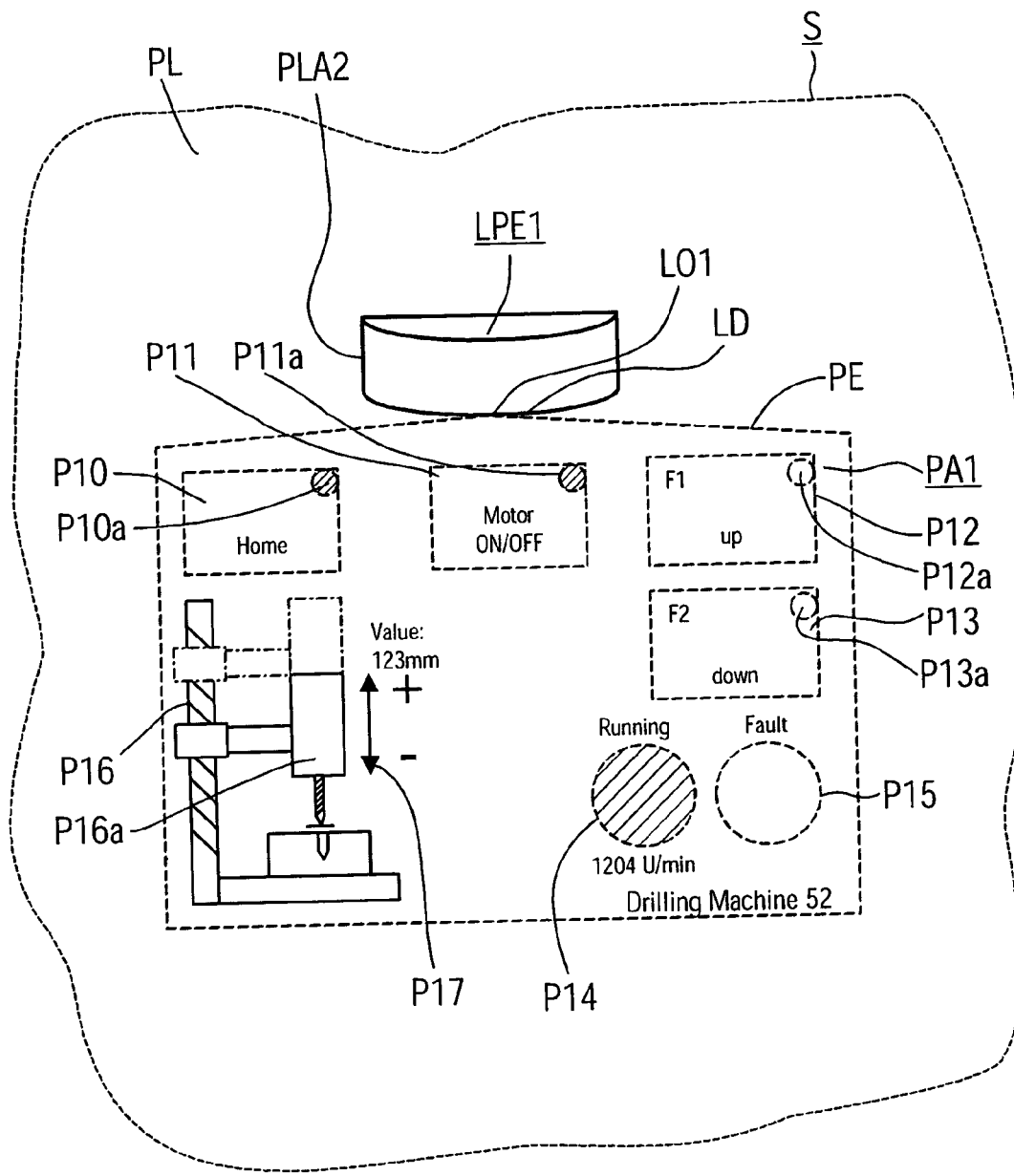
FIG. 7 is a top view of the mounting surface of a mounting device in which an HMI device according to the invention is rear wall mounted in such a way that only the optical transmitter and receiver module passes through the mounting surface and the surrounding mounting surface serves as a projection area for dynamic process images.
Figure 8:
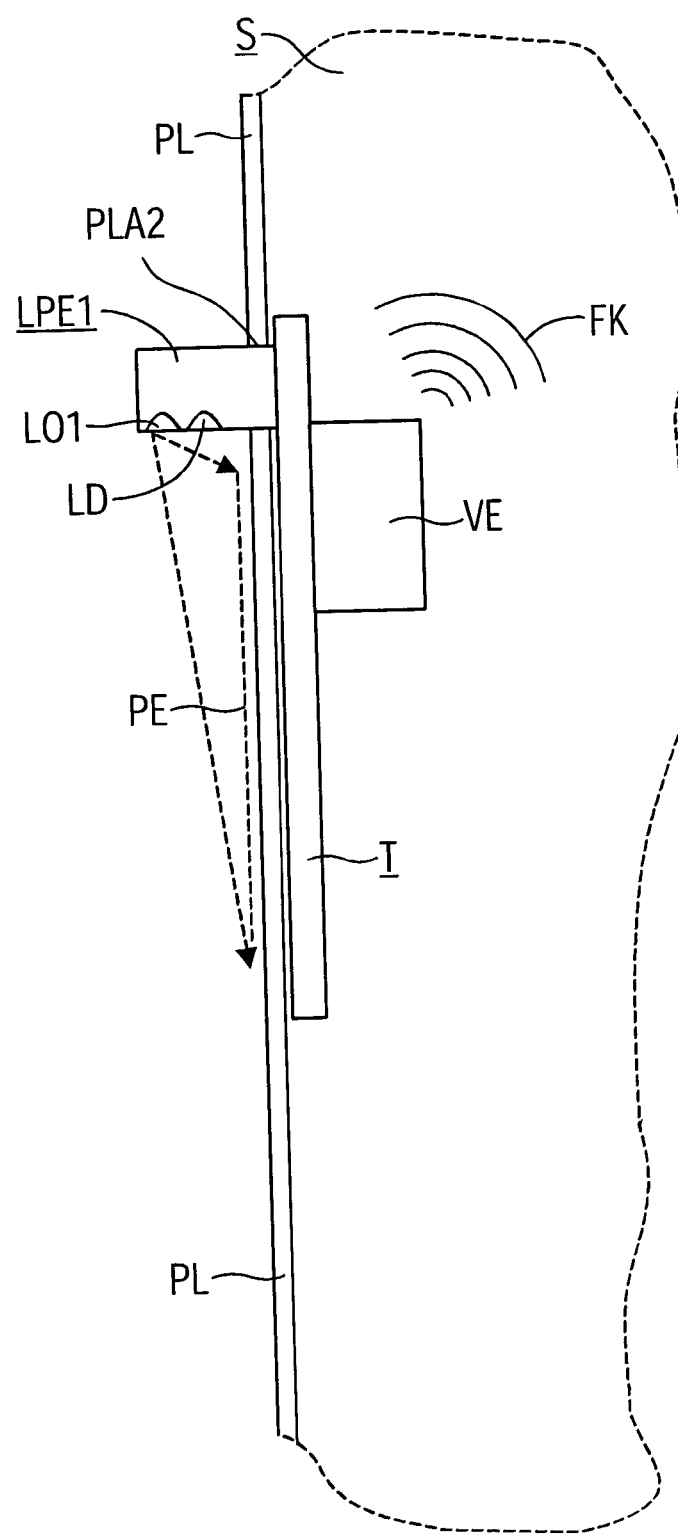
FIG. 8 is a section of the embodiment according to the invention depicted in FIG. 7.

FIG. 7 is a top view of the mounting surface PL of a mounting device S in which an HMI device according to the invention is rear wall mounted such that only the optical transmitter and receiver module LPE1 passes through the mounting surface PL and the surrounding area of the mounting surface is used directly as a projection area for the light image PE of a dynamic process image PA1. The process image PA1 shown by way of example corresponds to that of the embodiment of FIG. 1. In addition, FIG. 8 shows the associated section of the embodiment of the invention depicted in FIG. 7. FIG. 7 and FIG. 8 will now be described together.

The mounting device S, only a small detail of which is shown in FIG. 7, is, for example, a switchgear cabinet and has, e.g., a vertical mounting surface PL. This can be, for instance, a door or a sidewall of the switchgear cabinet. According to the invention, this door or sidewall has a second mounting opening PLA2 whose dimensions are adapted to the lengths of the sides of the optical transmitter and receiver module LPE1, which can thus be pushed through the mounting opening PLA2 from behind. The remaining components of the HMI device according to the invention, i.e., at least the processing module VE and an optional support plate T remain in the interior of the installation device VE and are thus shielded from external influences. As shown in FIG. 8, it is advantageous if here, too, the processing module VE in the interior of the housing has a wireless data transmission link FK to a central processing unit, which can also be accommodated in the interior of the mounting device S, e.g., a switchgear cabinet. In this case, if required, a user can remove the physical unit consisting of the optical transmitter and receiver module LPE1, the processing module VE and the optional support plate T mounted therebetween from the inside of the mounting surface PL and use it as an autonomous location-independent control terminal, like the embodiment of FIG. 4. The distance from the installation device S is limited only by the range of the data transmission link FK.

The physical unit consisting of at least the optical transmitter and receiver module LPE1 and the processing module VE is rear wall mounted behind the mounting opening such that only the optical transmitter and receiver module LPE1 reaches through the mounting surface PL, and the surrounding surface of the mounting device S is used as a projection area for a dynamic process image. If the mounting surface PL is, for example, the door of a switchgear cabinet, the entire outer surface of the switchgear cabinet door can be used as the projection area. In such a case, even complex dynamic process images can be reproduced at high resolution. In the example of FIG. 7, the process image PE of FIG. 2 is projected. Conventional fixation means can be used for rear wall mounting, such as screwed or clamped connections, magnetic fixation means or adhesive or glued connections. For the sake of clarity, these means are not depicted in the section shown in FIG. 8.

Figure 9:
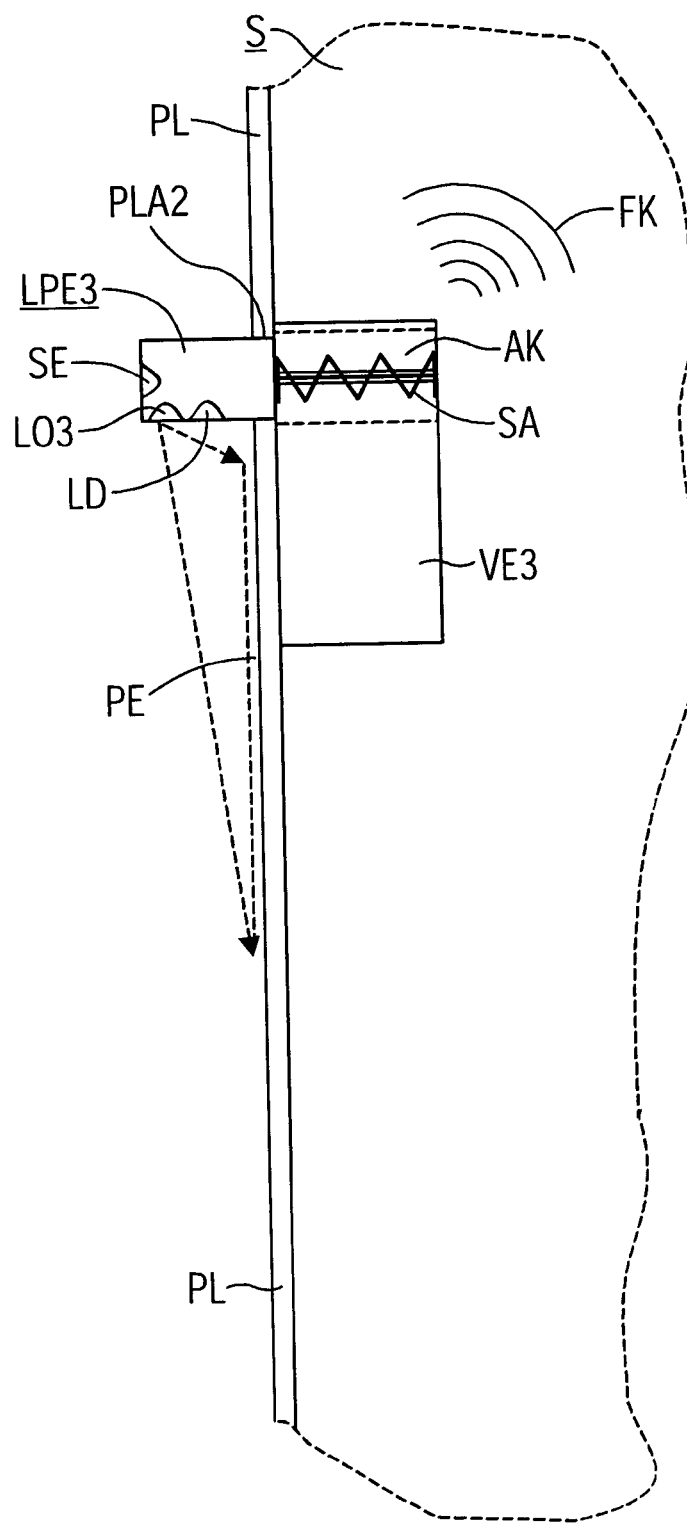
FIG. 9 is a section of an embodiment according to the invention corresponding to that depicted in FIG. 5 in which the optical transmitter and receiver module can again be lowered into a recess in the processing module.

The embodiment depicted in FIGS. 7 and 8 can advantageously be expanded by the preferably servoelectrically driven retraction and extension means of the optical transmitter and receiver module described with reference to the example of FIGS. 4 and 5. Accordingly, the sectional view of FIG. 9 shows a processing module VE3 provided with a recess AK to receive the optical transmitter and receiver module LPE3. For retraction and extension, servo drive means SA are provided, which can be activated using a control element SE on the topside of the optical transmitter and receiver module LPE3. In the extended state shown in FIG. 9, the HMI device has the same functionality as in the embodiment depicted in FIG. 8. Here, too, the area of the mounting surface PL, preferably below the transmitter and receiver module LPE3, is used as a projection area. In the retracted state, the topside of the transmitter and receiver module LPE3 is preferably flush with the mounting surface PL, such that only the control element SE is accessible from the outside.

An HMI device according to the present invention is suitable, in particular, for monitoring and controlling technical equipment. It is used particularly as an operator panel or a handheld terminal for machine control and machine monitoring. Furthermore, an automation system that acts on technical equipment can have at least one HMI panel according to the invention, which is connected to or integrated in this automation system.

The HMI device according to the present invention can also be used in tight spaces. For example, no switchgear cabinets are typically used in the plastics industry, i.e., particularly for plastic injection molding machines. Instead, the actual machine frames serve as mounting devices for HMI panels and other electrical equipment. Because of their mechanical configuration, the prior-art HMI panels have the drawback that the display must always be smaller than the mounting site itself because a corresponding amount of space is required for the display holders and for assembly. An HMI device according to the present invention overcomes these limitations because the entire area that is available below the optical transmitter and receiver module can be used for control and monitoring of a technical process.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. HMI device for monitoring and control of a technical process, comprising:
   a) a processing module, at least for computer-generating dynamic process images that have interactive regions,
   b) at least one optical transmitter and receiver module that has a data link to the processing module,
   b1) a projection means for generating light images of at least one of the dynamic process images,
   b2) a detection means for spatially detecting pointing actions of an operator to at least one of the interactive regions in the light image of the at least one dynamic process image, and
   c) a support plate providing a projection area for the light image of the at least one dynamic process image,
   wherein the at least one optical transmitter and receiver module is mounted to the support plate and the processing module is mounted behind the support plate, and
   wherein the support plate has edge lengths longer than respective edge lengths of the processing module, wherein the processing module is configured to insert into a mounting opening in a mounting surface, and wherein the support plate completely covers the mounting opening.

2. HMI device as claimed in claim 1, wherein the support plate is hermetically sealed over the mounting opening.

3. HMI device for monitoring and control of a technical process, comprising:
   a) a processing module, at least for computer-generating dynamic process images that have interactive regions, b) at least one optical transmitter and receiver module that has a data link to the processing module,
b1) a projection means for generating light images of at least one of the dynamic process images,
b2) a detection means for spatially detecting pointing actions of an operator to at least one of the interactive regions in the light image of the at least one dynamic processing image, and
c) a support plate providing a projection area for the light image of the at least one dynamic process image, wherein the support plate has a hermetic seal at least circumferentially along edges of the support plate.

4. HMI device for monitoring and control of a technical process, comprising:
a) a processing module, at least for computer-generating dynamic process images that have interactive regions,
b) at least one optical transmitter and receiver module that has a data link to the processing module,
b1) a projection means for generating light images of at least one of the dynamic process images,
b2) a detection means for spatially detecting pointing actions of an operator to at least one of the interactive regions in the light image of the at least one dynamic process image, and
(c) a mobile handheld terminal housing and an external housing side providing a projection area for the light image of the at least one dynamic process image.

5. HMI device for monitoring and control of a technical process, comprising:
a) a processing module, at least for computer-generating dynamic process images that have interactive regions,
b) at least one optical transmitter and receiver module that has a data link to the processing module,
b1) a projection means for generating light images of at least one of the dynamic process images, and
b2) a detection means for spatially detecting pointing actions of an operator to at least one of the interactive regions in the light image of the at least one dynamic process image,
wherein the at least one optical transmitter and receiver module and the processing module are configured as a physical unit such that the optical transmitter and receiver module retracts into a recess in the processing module.

6. HMI device as claimed in claim 5, wherein the physical unit further comprises a servo drive retracting and extending the optical transmitter and receiver module into and from the recess of the processing module.

7. HMI device for monitoring and control of a technical process, comprising:
a) a processing module, at least for computer-generating dynamic process images that have interactive regions,
b) at least one optical transmitter and receiver module that has a data link to the processing module,
b1) a projection means for generating light images of at least one of the dynamic process images, and
b2) a detection means for spatially detecting pointing actions of an operator to at least one of the interactive regions in the light image of the at least one dynamic process image,
wherein the optical transmitter and receiver module comprises separate detection elements for resolving at least one of a safety-related two-handed control and a multi-finger control of the at least one dynamic process image.

8. HMI device for monitoring and control of a technical process, comprising:
a) a processing module, at least for computer-generating dynamic process images that have interactive regions,
b) at least one optical transmitter and receiver module that has a data link to the processing module,
b1) a projection means for generating light images of at least one of the dynamic process images,
b2) a detection means for spatially detecting pointing actions of an operator to at least one of the interactive regions in the light image of the at least one dynamic process image, and
(c) at least one solar cell, at least for supplying power to the optical transmitter and receiver module and to the processing module.

9. HMI device for monitoring and control of a technical process, comprising:
a) a processing module, at least for computer-generating dynamic process images that have interactive regions,
b) at least one optical transmitter and receiver module that has a data link to the processing module,
b1) a projection means for generating light images of at least one of the dynamic process images, and
b2) a detection means for spatially detecting pointing actions of an operator to at least one of the interactive regions in the light image of the at least one dynamic process image,
wherein the optical transmitter and receiver module has a configurable detection threshold for adjusting the sensitivity of the optical transmitter and receiver module.

10. HMI device for monitoring and control of a technical process, comprising:
a) a processing module, at least for computer-generating dynamic process images that have interactive regions,
b) at least one optical transmitter and receiver module that has a data link to the processing module,
b1) a projection means for generating light images of at least one of the dynamic process images, and
b2) a detection means for spatially detecting pointing actions of an operator to at least one of the interactive regions in the light image of the at least one dynamic process image,
wherein at least the optical transmitter and receiver module is completely sealed for underwater applications.

11. An apparatus comprising:
at least one HMI device configured to monitor and control a technical process, comprising:
a processing module, at least for computer-generating dynamic process images that have interactive regions, and
at least one optical transmitter and receiver module that has a data link to the processing module, and has:
a projector generating light images of at least one of the dynamic process images and
a detector spatially detecting pointing actions of an operator to at least one of the interactive regions in the light image of the at least one dynamic process image; and
a mounting device for the at least one HMI device,
wherein the mounting device has a mounting opening in a mounting surface and rear wall mount for a physical unit including the at least one optical transmitter and receiver module and the processing module, and wherein the mounting opening and the rear wall mount are configured such that only the optical transmitter and receiver module projects through the mounting surface and the mounting device provides a projection area for the at least one dynamic process image.

12. The apparatus according to claim 11, wherein the mounting device is a switchgear cabinet.

13. The apparatus according to claim 11, wherein the mounting device is at least one of an operator console and a control console.

14. The apparatus according to claim 11, wherein the mounting device is a control panel.

15. Automation system which acts upon a technical installation, comprising:
- at least one human-machine interface configured to interface between an operator and the technical installation, comprising:
    - a processing module, at least for computer-generating dynamic process images that have interactive regions, and
    - at least one optical transmitter and receiver module that has a data link to the processing module, a projector generating light images of at least one of the dynamic process images, and a detector spatially detecting pointing actions of the operator to at least one of the interactive regions in the light image of the at least one dynamic process image,
- wherein the optical transmitter and receiver module comprises separate detection elements for resolving at least one of a safety-related two-handed control and a multi-finger control of the at least one dynamic process image.

* * * * *